United States Patent [19]

Libert

[11] Patent Number: 4,832,727
[45] Date of Patent: May 23, 1989

[54] MOLD OPENING AND CLOSING MECHANISM FOR AN INDIVIDUAL SECTION (I.S.) GLASSWARE FORMING MACHINE

[75] Inventor: Harold C. Libert, Union City, Ind.

[73] Assignee: Maul Technology Co., Winchester, Ind.

[21] Appl. No.: 158,899

[22] Filed: Feb. 22, 1988

[51] Int. Cl.⁴ .............................................. C03B 9/40
[52] U.S. Cl. ..................................... 65/357; 65/261; 65/313; 65/314; 65/360
[58] Field of Search ................. 65/261, 313, 314, 317, 65/357, 360

[56] References Cited

U.S. PATENT DOCUMENTS

| | | | |
|---|---|---|---|
| 2,011,980 | 8/1935 | Miller | 65/314 |
| 2,834,155 | 5/1958 | Allen | 65/360 |
| 3,233,999 | 2/1966 | Mumford | 65/359 |
| 3,617,233 | 11/1971 | Mumford | 65/357 X |
| 4,543,118 | 9/1985 | Nebelung | 65/360 |

Primary Examiner—Arthur Kellogg
Attorney, Agent, or Firm—Woodard, Emhardt, Naughton, Moriarty & McNett

[57] ABSTRACT

An apparatus for ensuring alignment during opening and closing of mold halves in an individual section (I.S.) glassware forming machine has a cylinder containing a pair of mutually reciprocating pistons linked to a pair of mold half actuating shafts. A pair of gear racks, each linked to one of the pistons, mesh with a common idler gear. A plug and cushion combination cushion the opening stroke of the mechanism.

24 Claims, 7 Drawing Sheets

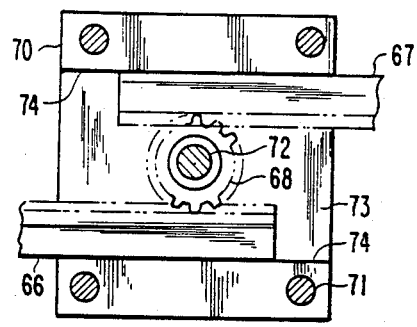
Fig.4
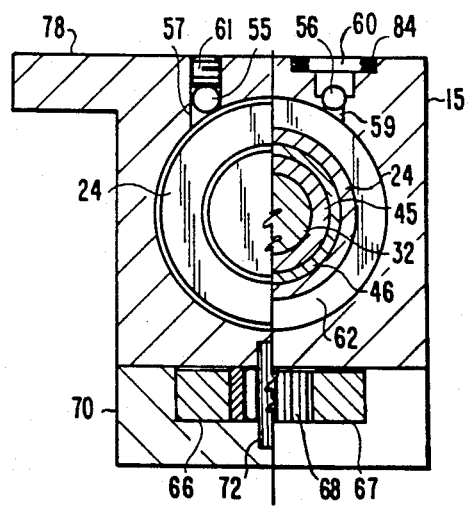 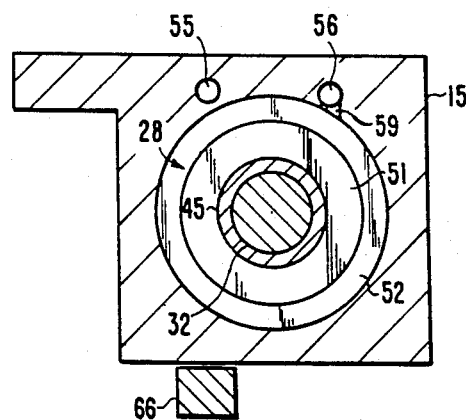
Fig.5  Fig.6

MOLD OPENING AND CLOSING MECHANISM FOR AN INDIVIDUAL SECTION (I.S.) GLASSWARE FORMING MACHINE

FIELD OF THE INVENTION

The subject invention relates generally to the manufacture of glass bottles and, more particularly, to devices for opening and closing mold halves in an individual section (I.S.) glassware forming machine.

BACKGROUND OF THE INVENTION

Conventional I.S. glassware forming machines form glass bottles by what is known in the art as either a "press and blow" or a "blow/blow" method. Gobs of molten glass are delivered first to a parison or blank mold station where molten glass gobs are preformed into hollow parisons or blanks by either a pressing or blowing operation. Thereafter, the parisons are transferred to a blow mold station by an inverting movement which carries the parisons through a 180° arc to open pairs of blow mold halves which then close about the parisons. The parisons are then blown in a fashion which permits them to assume their final form inside the blow molds. At each station, the mold halves are opened and closed by mold holder arms secured to rotatable shafts.

It is important that the mold holder arms open and close properly in order that the forming operations at the blank and blow mold stations are properly performed. Various mechanisms have been employed for this purpose. One approach to the design of such mechanisms, favored for its simplicity and reliability, has been to employ a fluid actuated piston and cylinder to simultaneously move the mold holder arms between their open and closed positions. A mold opening and closing mechanism of this type is disclosed in U.S. Pat. No. 2,702,444 to Rowe. In the Rowe device, the molds are open and closed by pneumatic actuation of a single piston having a double ended piston rod, the ends of which have gear racks which mesh with segment gear arms. The gear arms are connected by separate linkages to shafts which actuate the mold holder arms. A disadvantage of mechanisms of this type is that even a slight amount of drag or misalignment anywhere in the linkage system or within the piston chamber can translate and be magnified through the linkages to the mold halves, resulting in eccentric movement of the mold halves. If the mold halves are off center by as much as ten- to fifteen-thousandths of an inch, seams in the glass product and other unacceptable problems will result.

A dual rack with a common pinion gear is disclosed in U.S. Pat. No. 3,445,218. The mechanism disclosed therein uses a single piston design with a gear rack and sector gear to drive the pinion gear. The pinion gear in turn drives the racks which open and close the mold halves. Serial transmission of the piston-actuated opening and closing force through a series of gears can result in mechanical inefficiency and increased wear and breakdown.

What is needed is a hydraulic mold opening and closing mechanism which provides improved security against misalignment of the mold halves.

SUMMARY OF THE INVENTION

Generally speaking, there is provided an improved mold opening and closing mechanism for use in an individual section (I.S.) glassware forming machine. A cylinder contains a pair of mutually reciprocating pistons which are linked to a pair of respective mold half actuating shafts. A pair of gear racks, each connected to a separate piston, mesh with a common idler gear. A cushion well and plug combination is also provided to cushion the mechanism's movement at the end of the opening stroke.

It is an object of the present invention to provide an improved mold opening and closing mechanism for an individual section glassware forming machine.

It is another object of the present invention to provide a mold opening and closing mechanism which serves to better maintain alignment of the mold halves.

It is a further object of the present invention to provide a mold opening and closing mechanism which more equally distributes the actuating forces between the mold halves.

Further objects and advantages of the present invention will become apparent from the following description of the preferred embodiment.

BRIEF DESCRIPTION OF THE DRAWINGS

FIG. 2 is an enlarged top, cross-sectional view of a portion of the mold opening and closing mechanism of FIG. 1a.

FIG. 3 is a side, partially cross-sectional view of the mold opening and closing mechanism of FIG. 1a.

FIG. 4 is a top cross-sectional view of the rack guide area of the mold opening and closing mechanism taken along the lines 4—4 of FIG. 3 and viewed in the direction of the arrows.

FIG. 5 is a side, split and cross-sectional view of the mold opening and closing mechanism taken along the lines 5—5 of FIG. 1a and viewed in the direction of the arrows.

FIG. 6 is a side, cross-sectional view of the mold opening and closing mechanism taken along the lines 6—6 of FIG. 1b and viewed in the direction of the arrows.

DESCRIPTION OF THE PREFERRED EMBODIMENT

Figure 1A:
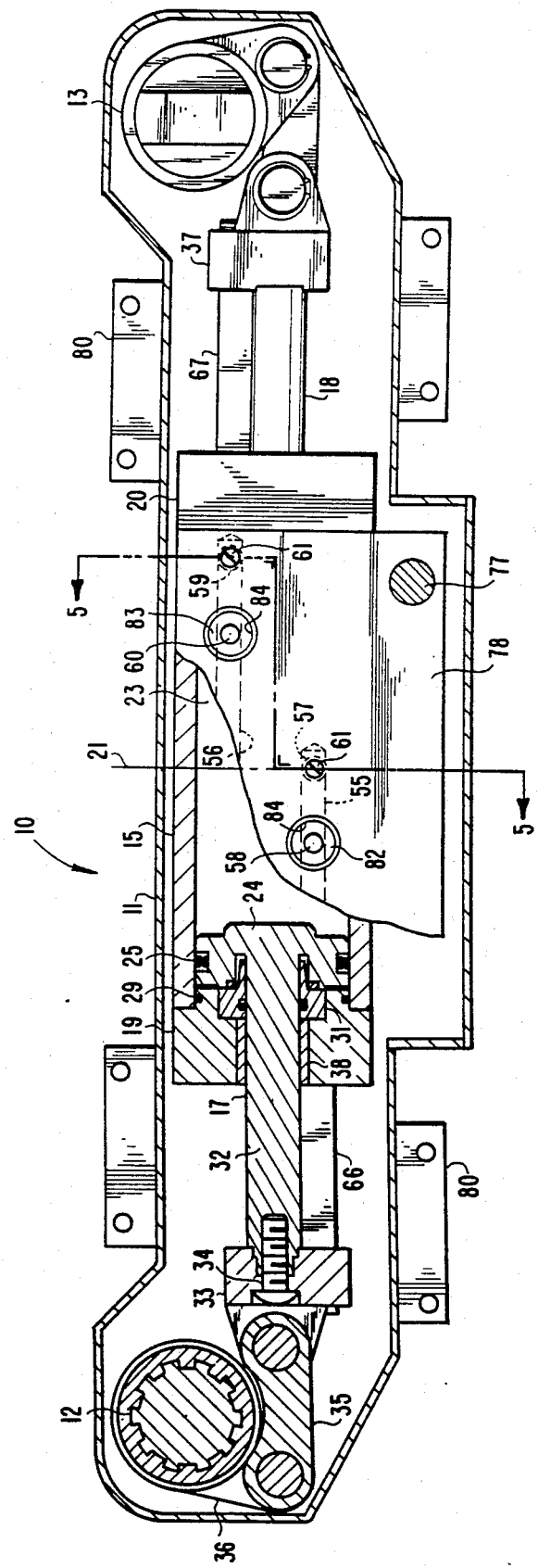
FIG. 1a is a top, partially cross-sectional view of a mold opening and closing mechanism in the closed position in accordance with the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, there is shown a hydraulic mold opening and closing mechanism for an I.S. glassware forming machine in accordance with the preferred embodiment of the present invention. A conventional I.S. glassware forming machine has both a blank mold station where parisons or blanks are formed within a pair of abutting blank mold halves and a blow mold station where the blanks or parisons are blown into their final form within a pair of abutting blow mold halves. In either case the mold halves are reciprocated between open and closed positions by mold holder arms which are secured to and driven by rotatable shafts. The present invention is adapted to operate with the mold opening and closing mechanism at either the blank mold station or the blow mold station. The first such description which follows will pertain to the blow mold station followed by description of the present invention adapted to the blank mold station.

Referring to FIG. 1a, there is shown a mold opening and closing mechanism 10 in accordance with the preferred embodiment of the present invention and adapted to operate at the blow mold station of an I.S. glassware forming machine. Mechanism 10 is generally contained within oil tank 11 and includes a pair of shafts 12 and 13 which are operable to actuate a pair of mold halves (not shown) in a conventional manner. A cylinder 15 contains mutually reciprocating pistons 17 and 18. Caps 19 and 20 cover the ends of cylinder 15 with o-rings 29 provided for sealing therebetween. Mechanism 10 is symmetrical about central plane 21 and description of the components of mechanism 10 will hereinafter be directed toward just one-half of mechanism 10 with exceptions being expressly provided. The directional designation of "forward" which appears in the following description indicates a direction toward central plane 21 while "rearward" indicates away from central plane 21.

Figure 1B:
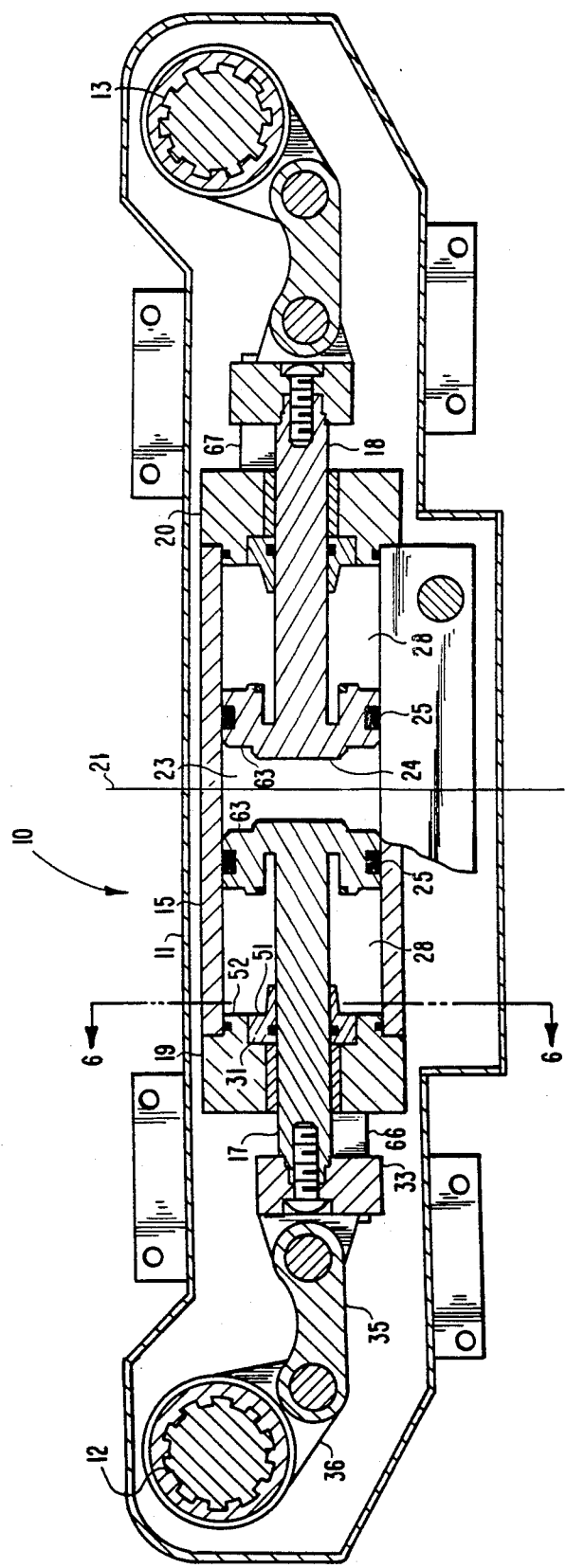
FIG. 1b is a top, partially cross-sectional view of the mold opening and closing mechanism of FIG. 1a and shown in the open position.

With the blow mold halves (not shown) in the open position, pistons 17 and 18 rest mutually apart in an open position and against caps 19 and 20 as shown in FIG. 1a. With the blow mold halves in the closed position, pistons 17 and 18 rest near one another, in a closed position, close to and symmetrical about central plane 21 as shown in FIG. 1b. A forward compression chamber 23 is defined by cylinder 15 and the forward faces of heads 24 of pistons 17 and 18. Rearward compression chamber 28 (FIG. 1b) are defined behind piston heads 24 by cylinder 15, the rearward faces of piston heads 24, caps 19 and 20 and cushion inserts 31. O-rings 25 surrounding piston heads 24 provide a fluid seal between forward chamber 23 and rearward chambers 28. In the preferred embodiment, o-rings 25 are quad-rings commercially available from Minnesota Rubber at 3630 Wooddale Ave., Minneapolis, Minn. During a mold closing compression stroke, with pistons 17 and 18 in their open position (FIG. 1a), fluid is introduced into rearward chambers 28, driving pistons 17 and 18 together and into their closed position. During a mold opening compression stroke, with pistons 17 and 18 in their closed position (FIG. 1b), fluid is introduced into forward chamber 23, driving pistons 17 and 18 apart and into their open position.

In the preferred embodiment, piston 17 is a unitary cast component having a head 24 and a rod 32. Rod 32 is connected to rack holder 33 by screw 34, with rack holder 33 being mechanically connected to shaft 12 by link 35 and lever 36. Rod 32 of piston 17 is held for sliding movement within cap 19 by bushing 38.

Figure 2:
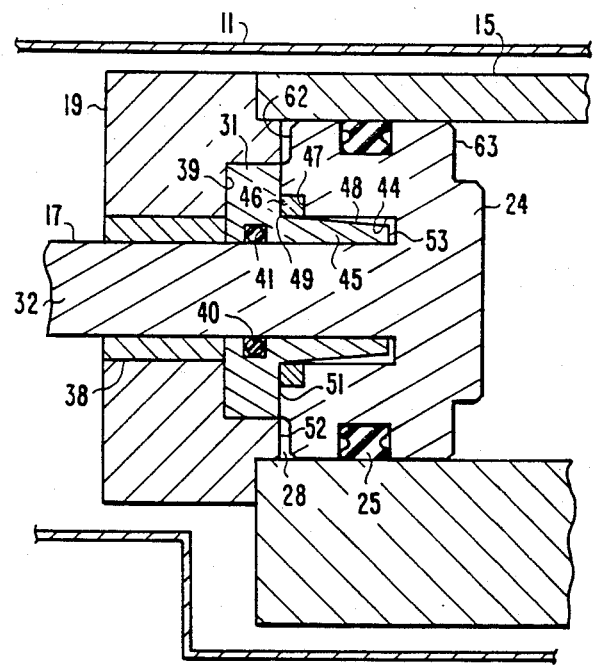
Figure 3:
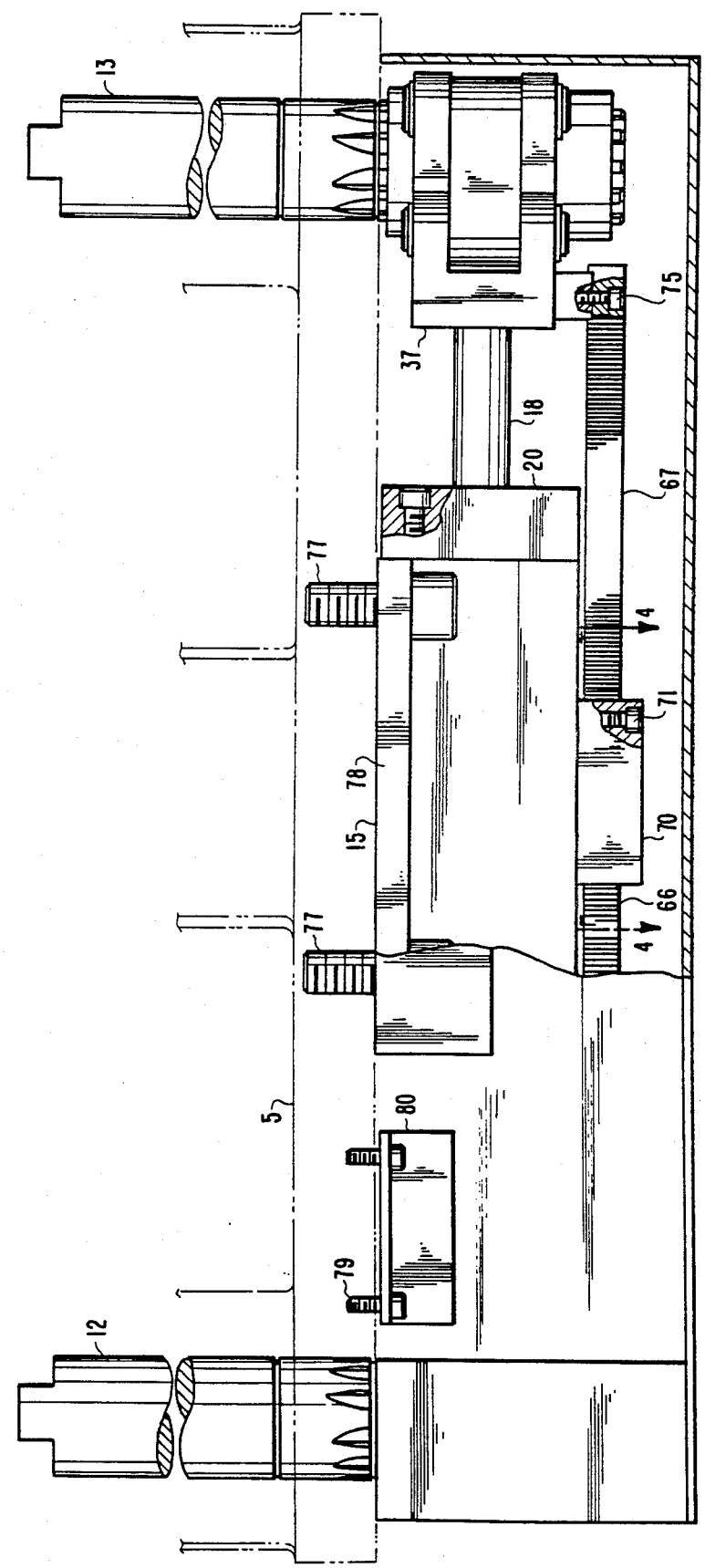

Referring to FIG. 2, insert 31 is press fit within annular recess 39 of cap 19 to provide a fluid seal between cap 19 and insert 31. Rod 32 extends and slides through both bushing 38 and insert 31 with o-ring 40 provided within interior annular recess 41 of insert 31 to provide fluid sealing between rod 32 and insert 31. Defined within piston 17, essentially radially between rod 32 and head 24, is annular cylindrical cushion well 44. Cushion insert 31 includes a forwardly extending, annular cylindrical plug portion 45 which surrounds rod 32 and which is disposed relative to piston 17 to enter cushion well 44 at the end of the mold opening stroke. Cushion insert 31 also includes an annular disc portion 51 which lies in the same plane with disc face 52 of cap 19, disc portion 51 and disc face 52 forming the rearward wall of rearward compression chamber 28 (FIGS. 1b and 2). Disc portion 51 also acts as the stop surface for piston 17 as will be described herein.

The rearwardly facing opening of cushion well 44 is defined by steel, rectangular cross-section ring 46 which is press fit within rearwardly facing, interior annular recess 47 of piston head 24. (FIGS. 2 and 5) The exterior surface 48 of plug portion 45 is frustoconical, tapering forwardly and with the larger outside diameter (indicated generally at 49) being approximately equal to the inside diameter of steel ring 46. The length of plug portion 45 is less than the depth of cushion well 44 so that when piston 17 is in the open position, with head 24 abutting disc portion 51, end 53 of plug portion 45 does not contact head 24.

Referring again to FIGS. 1a, 5 and 6, fluid pressure is provided by conventional means to forward chamber 23 as by forward fluid passage 55 and to rearward chambers 28 as by common rearward fluid passage 56. Forward passage 55 communicates through port 57 with forward chamber 23. Rearward passage 56 communicates with rearward chambers 28 through ports 59. Both passages 55 and 56 are bored from the left end of cylinder 15. Port 57, which provides communication from passage 55 to chamber 23, is bored downwardly through passage 55 and into chamber 23. Passage 55 at the left (not shown) and port 57 are plugged at their outer ends by suitable plugs 61. Feed bore 58 is drilled downwardly into passage 55 to provide an entrance/exit for fluid between passage 55 and the pressure source. Ports 59 (only one shown) provide communication from common passage 56 to rearward chamber 28. Ports 59 are each drilled and plugged like port 57. Ports 59 are drilled in cylinder 15 so that, in the fully assembled condition, the planes defined by disc portion 51 and disc face 52 are tangential with the rearward side of the respective ports 59. Passage 56 is plugged at its left, outward end like passage 55. Passage 56 is also provided with a feed bore 60 like feed bore 58 of passage 55. Feed bores 58 and 60 are counter-bored to provide ledges 82 and 83, respectively, for receipt of o-rings 84, which provide fluid-tight connections with the pressure source.

Fluid pressure is provided to forward chamber 23 and rearward chambers 28 by conventional means well known in the art. In the preferred embodiment, an hydraulic pressure source (not shown) is connected with feed bores 58 and 60 which are in communication with forward and rearward chambers 23 and 28. Also provided are an appropriate set of control valves (not shown) between feed bores 58 and 60 and the source of hydraulic pressure to allow fluid pressure in to port 57 (and into chamber 23) and out of port 59 (and out of chambers 28) for actuating the mold opening stroke. The set of control valves reverses the flow direction to and from feed bores 58 and 60 to actuate the mold closing stroke.

Referring again to FIG. 2, the rearard side of each piston head 24 defines an annular and radially outer recess 62 which is in communication with its respective port 59 when pistons 17 and 18 are in the open position as shown in FIG. 1a. When piston 17 is in its open position and abutting insert 31, recess 62 and disc face 52 define a minimum starter volume for the respective rearward pressure chamber 28. Fluid introduced into rearward chambers 28 quickly fills the volume defined by annular recess 62 and disc face 52, allowing hydraulic pressure to act evenly on the rearward side of piston head 24. The forward side of each piston head 24 has a similar recess 63 which acts in like fashion when pistons 17 and 18 are in the closed position. As seen in FIGS. 1a and 2, when in the open position, pistons 17 and 18 will rest abuttingly against insert 31. In the closed position (FIG. 1b), pistons 17 and 18 will approach each other but will not touch. This is because mold halves must be allowed to come together quickly and completely with no impedence and are to be held together with great force. Although pistons 17 and 18 will never come completely together, recesses 63 are provided to assure a minimum starter pressure volume and to allow for occasional adjustment of the linkages.

Pistons 17 and 18 are kept in synchronous, reciprocal and symmetrical movement about central plane 21 by racks 66 and 67 and idler pinion 68. (FIGS. 1a, 1b and 3–6). Rack guide 70 is generally U-shaped having a flat floor 73 and upstanding parallel walls 74. Guide 70 is mounted to the underside of cylinder 15 by appropriate fasteners such as screws 71. Idler pinion is mounted for free rotation between floor 73 of guide 70 and cylinder 15 by pin 72. Racks 66 and 67 are each mounted at their outer ends to and below respective rack holders 33 and 37 by screws 75. The opposite end of each rack 66 and 67 extends from its respective rack holder 33 and 37, on opposite sides of pinion 68, vertically between cylinder 15 and floor 73 and horizontally between pinion 68 and one respective wall 74 of guide 70. The above-described components are sized and assembled such that racks 66 and 67 mesh with pinion 68 and are always parallel to each other. Idler pinion 68 is a nondriving gear and serves only to maintain equal and opposite movement of pistons 17 and 18 through racks 66 and 67. Pre-assembled and aligned, racks 66 and 67 and pinion 68 will ensure that the mold halves (not shown) will continuously close and contact each other on a predetermined center line.

During the final portion of the mold opening stroke, plug portions 45 of inserts 31 enter cushion wells 44, trapping the fluid therein. As plug portions 45 continue to enter wells 44, the effective escape area for trapped fluid decreases, increasing the pressure within the well and increasing the resistance to the opening stroke. The opening force transmitted to the mold halves is thereby cushioned.

Cylinder 15 is mounted to the blow mold bracket of the glassware forming maching (shown in phantom in FIG. 3 at 5) by bolts 77 which extend through flanged portion 78 of cylinder 15. Oil tank 11 is similarly mounted by screws 79 which extend through flanges 80 of oil tank 11.

Figure 7:
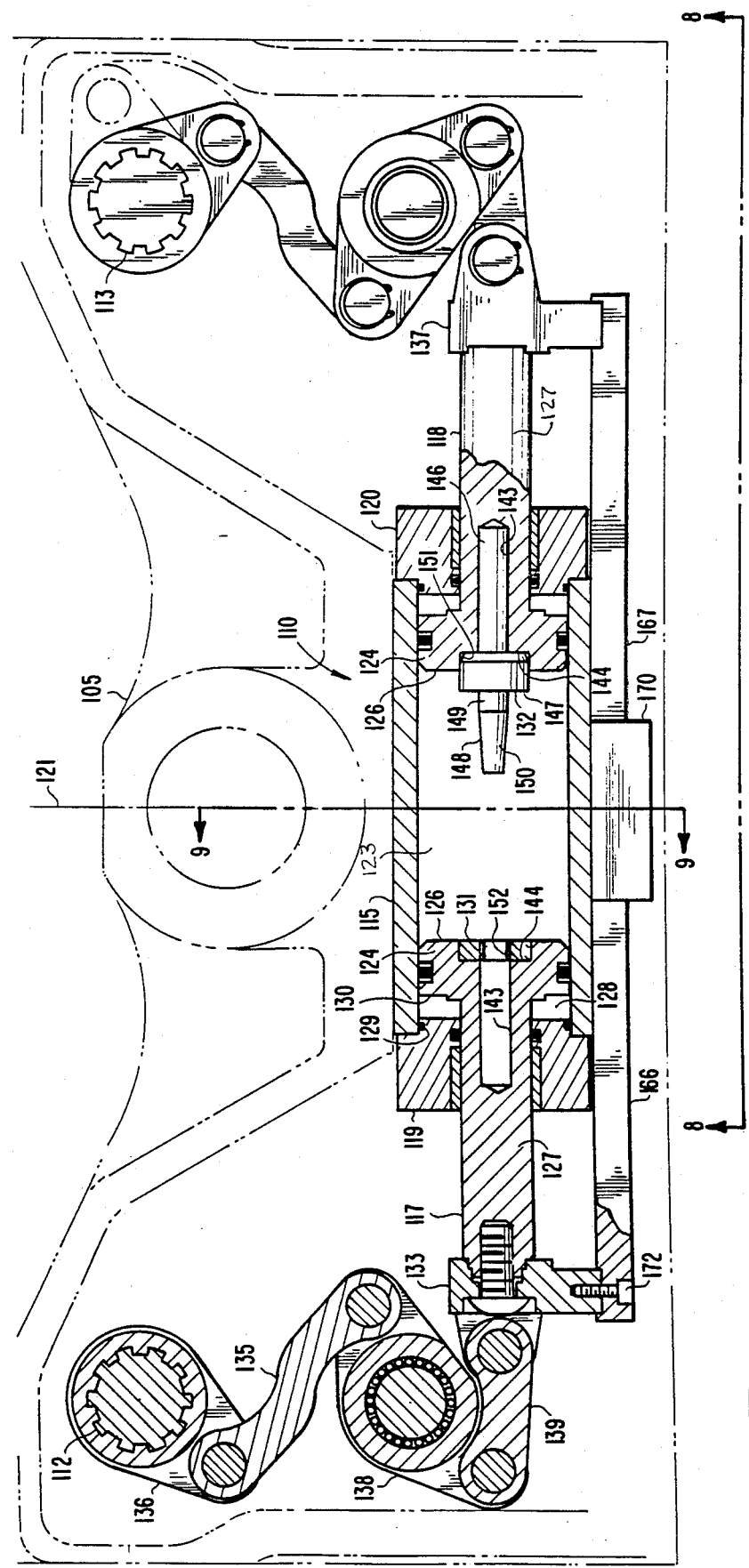
FIG. 7 is a top, partially cross-sectional view of a mold opening and closing mechanism in accordance with another embodiment of the present invention and shown in the closed position.

Referring now to FIG. 7 there is shown a mold opening and closing mechanism 110 in accordance with the preferred embodiment of the present invention and adapted to operate at the blank mold station of an I.S. glassware forming machine. Mechanism 110 is configured to operate in a manner similar to that of mechanism 10 shown in FIGS. 1 through 5. Unlike mechanism 10, mold opening and closing mechanism 110 is mounted to the side of the blank mold bracket of the glassware forming machine (shown in phantom at 105). Mechanism 110 includes a pair of shafts 112 and 113 which are operable to actuate a pair of blank mold halves (not shown) in a conventional manner. Mechanism 110 includes a cylinder 115, a pair of reciprocating pistons 117 and 118, caps 119 and 120 with o-rings 129 and rack holders 133 and 137. Mechanically connecting shafts 112 and 113 with rack holders 133 and 147, respectively, are levers 136, links 135, bell cranks 138 and links 139. The additional links 135 and bell cranks 138 of mechanism 110 cause the blank mold halves (not shown) to be in their open position when pistons 117 and 118 come together at central plane 121. The closed position of the blank mold halves and mechanism 110 is achieved when pistons 117 and 118 move to their opposite extreme, away from each other as shown in FIG. 7. Rearward pressure chambers 128 are defined similar to chambers 28 of mechanism 10 with annular outer recesses 130 provided at the rear of each piston head 124. Forward compression chamber 123 is likewise defined by cylinder 115 and faces 126 of pistons 117 and 118.

In the preferred embodiment, pistons 117 and 118 are identical and each comprise a unitary cast component having a head 124 and rod 127. Each piston is provided with an axial bore 143 and an axial cylindrical recess 144. Recess 144 has a diameter approximately twice that of bore 143. Cushioning means are provided by steel annular insert 131 and plug insert 132. Plug insert 132 includes anchoring rod 146, base portion 147 and cushion plug 148. Cushion plug 148 includes a cylindrical portion 149 adjacent to base portion 147 and a forwardly tapering portion 150 extending axially from cylindrical portion 149 towards bore 143 of the opposite piston 117. The rear of base portion 147 is slightly tapered at 151 to facilitate the insertion of plug insert 132 into bore 143 and recess 144.

Annular insert 131 is press fit within annular recess 144 of one of the two pistons of mechanism 110 while anchoring rod 146 of a plug insert 132 is press fit within bore 143 of the other of the two pistons of mechanism 110. As shown in FIG. 7, base portion 147 extends forwardly of the face 126 of its respective piston 118. When pistons 117 and 118 approach each other with cushion plug 148 entering bore 143 of the opposite piston (117), annular insert 131 will contact base portion 147, limiting further converging movement of pistons 117 and 118. A minimum annular volume is thereby created between the faces 126 of each piston and radially between the interior walls of cylinder 115 and base portion 147.

Figure 9:
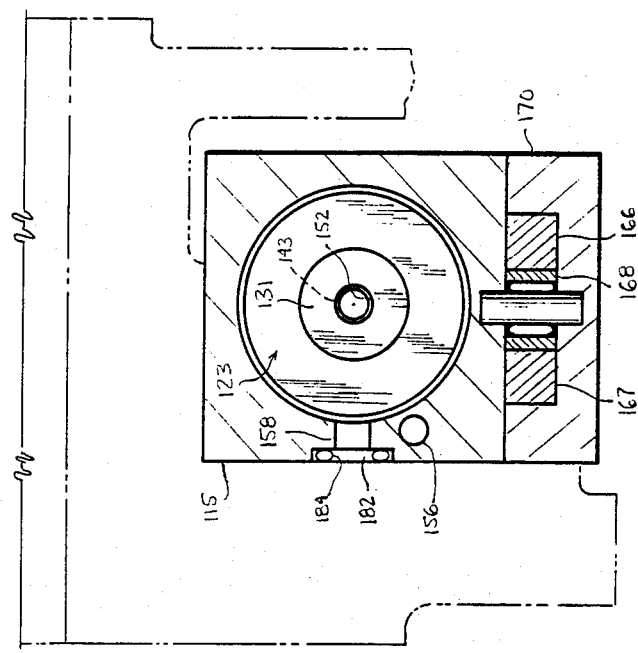
FIG. 9 is a side, cross-sectional view of the mold opening and closing mechanism taken along the lines 9—9 of FIG. 7 and viewed in the direction of the arrows.

Fluid pressure is provided to forward chamber 123 and to rearward chambers 128 by conventional means in a manner similar to that described for mechanism 10. Referring to FIG. 9, feed bore 158 provides direct communication into forward chamber 123. The center of feed bore 158 passes directly through central plane 121. Feed bore 158 is counter-bored, creating ledge 182 for receipt of o-ring 184 which provides a fluid-tight connection with a conventional hydraulic pressure source. Fluid pressure is provided to rearward pressure chambers 128 substantially identically as is provided to rearward chambers 28 of mechanism 10 (see FIGS. 1a, 5 and 6) and includes, for example, a rearward fluid passage 156 (FIG. 9).

Referring back to FIG. 7, as fluid is introduced into rearward chambers 128, pistons 117 and 118 are biased together toward the open position. Forwardly tapering portion 150 of cushion plug 148 enters hole 152 of insert 131 and continues onward into bore 143 of piston 117. As pistons 117 and 118 draw closer to one another, the diameter of forwardly tapering portion 150 increases relative to the inner diameter of hole 152, thereby allowing a smaller effective area for fluid to escape bore 143 of piston 117. The resultant, increasing resistive force is transmitted through the pistons and respective linkages to cushion the opening of the blank mold halves (not shown). The outer diameter of cylindrical portion 149 of cushion plug 148 is only fractionally smaller than the interior diameter of hole 152 of annular insert 131 in order to create the maximum cushioning effect just prior to contact of base portion 147 with insert 131.

Figure 8:
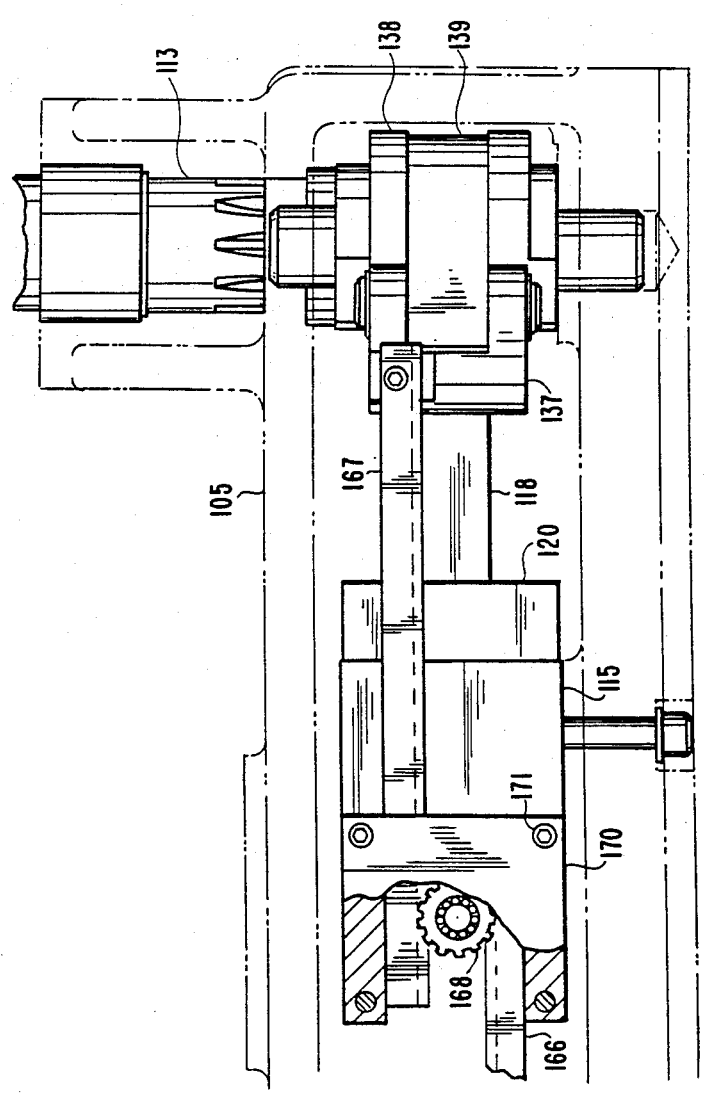
FIG. 8 is a side, elevational view of the mold opening and closing mechanism taken along the lines 8—8 of FIG. 7, viewed in the direction of the arrows and with a portion broken away to expose the racks and pinion arrangement.

Referring to FIGS. 7 and 8, mechanism 110 is also provided with an equalizing means to keep pistons 117 and 118 in synchronous, reciprocal and symmetrical movement about central plane 121. The equalizing means, like that of mechanism 10, comprises a pair of racks 166 and 167 and an idler pinion 168. To maximize the space available within the enclosure containing glassware forming machine 105, racks 166 and 167 and pinion 168 are mounted to the side of cylinder 115 with rack guide 170 mounted to the side of cylinder 115 by appropriate means such as socket-head cap screws 171. The outer ends of racks 166 and 167 are mounted to the sides of rack holders 133 and 137, respectively, by screws 172. Pinion 168 is a nondriving gear and serves only to maintain equal and opposite movement of pistons 117 and 118 through racks 166 and 167 and rack holders 133 and 137, respectively. The components of mold opening and closing mechanism 110 are preassembled and aligned to ensure that, through the operation of racks 166 and 167 and pinion 168, blank mold halves will continuously open and close in perfect alignment and close on a predetermined center line.

The particular sizes and configuration of the elements of mechanism 110 are such that pistons 117 and 118 will never contact caps 119 and 120 in that the blank mold halves (not shown) will contact one another and be biased tightly together before the pistons reach their respective caps. Recesses 130 are nevertheless provided to ensure a minimum starter volume for rearward pressure chambers 128 and to allow for occasional adjustment which might bring pistons 117 and 118 closer to caps 119 and 120.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for opening and closing the blank or blow mold halves in an I.S. glassware forming machine, comprising:
    a pair of shafts for actuating the mold halves;
    a cylinder mounted adjacent to the blank or blow mold bracket of the I.S. glassware forming machine;
    a pair of double acting pistons reciprocable within said cylinder, each of said pistons being linked to a different one of said shafts;
    each of said pistons having a forward stroke wherein said pistons are urged toward each other and having a rearward stroke wherein said pistons are urged away from each other;
    fluid actuating means for urging said pistons between said forward and rearward strokes; and
    equalizing means for equalizing the movement of said pistons between said forward and rearward strokes, said equalizing means including first and second gear racks, each connected to a different one of said pistons and an idler gear meshing with said gear racks and causing said pair of pistons to move equally and opposite to each other within said cylinder.

2. The apparatus for opening and closing mold halves of claim 1 and further comprising:
    a housing encasing said gear racks and said idler gear and containing a lubricating fluid for lubricating said gear racks and said idler gear.

3. The apparatus for opening and closing mold halves of claim 1 and further comprising:
    cushioning means for cushioning the movement of said pistons including a cushion well and plug combination disposed between one of said pair of pistons and said cylinder.

4. The apparatus for opening and closing mold halves of claim 3 wherein said cushion and plug combination includes:
    said one of said pistons having a front and a back, the back defining an annular cylindrical cushion well, and
    a cylindrical cushion insert mounted to said cylinder and disposed to enter said cushion well during the rearward stroke.

5. The apparatus for opening and closing mold halves of claim 4 wherein the back of said one of said pistons defines an annular ledge extending around said cushion well, and wherein said cushion well and plug combination further includes an annular ring seated in said ledge and defining an opening to said cushion well.

6. The apparatus for opening and closing mold halves of claim 5 wherein said insert includes a cylindrical flange portion for entering said cushion well, said flange portion having a leading end and a trailing end and a variable outside diameter with a maximum value at the trailing end and which decreases toward the leading end.

7. The apparatus for opening and closing mold halves of claim 6 wherein said annular ring defines an opening diameter substantially equal to the maximum outside diameter of said cylindrical flange portion.

8. The apparatus for opening and closing mold halves of claim 4 wherein said cushion well and said insert are coaxial with said one of said pistons.

9. The apparatus for opening and closing mold halves of claim 1 and further comprising:

cushioning means for cushioning the movement of said pistons including a cushion well and plug combination disposed between said pistons.

10. The apparatus for opening and closing mold halves of claim 9 wherein each of said pistons has a mutually facing front end and wherein said cushion and plug combination includes:
a cushion well defined in the front end of one of said pistons and a plug fixed to the front end of the other of said pistons and extending toward the one of said pistons, said cushion well and plug situated relative to said pistons such that said plug enters said cushion well during the forward stroke.

11. The apparatus for opening and closing mold halves of claim 10 wherein said cushion well and plug are coaxial with said pistons.

12. The apparatus for opening and closing mold halves of claim 10 wherein said plug has a varying cross-sectional area along the length thereof for cushioning the opening of the mold halves.

13. The apparatus of claim 10 wherein said plug has a generally frustoconical shape.

14. An apparatus for opening and closing the blank or blow mold halves in an I.S. glassware forming machine, comprising:
a pair of shafts operable to open and close the blank or blow mold halves in an I.S. glassware forming machine;
piston actuation means for actuating said shafts, said piston actuation means including a cylinder mounted adjacent to the blank or blow mold bracket of the I.S. glassware forming machine and a pair of double acting fluid actuated pistons mutually reciprocable within said cylinder, each of said pistons linked to a different one of said shafts;
linkage means for linking each of said shafts with said actuation means; and,
equalizing means, connected to said actuation means, for equalizing the actuating force from said actuation means through said linkage means, and to each of said shafts, said equalizing means including:
a pair of gear racks each connected to said linkage means for movement in direct proportion with one each of said pair of shafts, and
an idler gear meshing with said gear racks.

15. The apparatus of claim 14 wherein said piston actuation means is hydraulic.

16. The apparatus of claim 15 and further comprising:
cushioning means for cushioning the movement of said pistons including a cushion well in one of said pistons and a plug extending from the other of said pistons, the plug and cushion well axially arranged and disposed relative to said pistons to permit the plug to enter the cushion well as said pistons are urged together.

17. The apparatus of claim 16 wherein the plug has a generally frustoconical shape.

18. The apparatus of claim 15 and further comprising:
cushioning means for cushioning the movement of said pistons including a cushion well defined in one of said pistons and a plug extending from said cylinder, the plug and cushion well axially arranged and disposed in said piston actuation means to permit the plug to enter the cushion well as said pistons are urged apart.

19. The apparatus of claim 18 wherein the plug has an annular cross-section and a generally frustoconically shaped outer surface, the plug and the cushion well being coaxial with said pistons.

20. An apparatus for opening and closing mold halves in an I.S. glassware forming machine, comprising:
a pair of shafts for actuating the mold halves;
a cylinder;
a pair of pistons mutually reciprocating within said cylinder;
a pair of linkage assemblies, one each connected between one of said shafts and one of said pistons, each said linkage assembly being identically formed;
piston actuating means for actuating rotation of said shafts via each of said linkage assemblies;
a pair of gear racks, one each being connected to one each of said pistons;
an idler gear meshing with said gear racks so as to prevent unequal movement of said pistons in said cylinder; and,
hydraulic actuated cushioning means for cushioning the opening movement of the mold halves, said hydraulic actuated cushioning means including a cushion well and a plug, the plug and cushion well axially arranged and disposed within said cylinder to permit the plug to enter the cushion well as the mold halves are opened, said cushion well defining a blind opening and said plug having a diameter which decreases in a direction towards said cushion well thereby providing a decreasing bleed out rate of hydraulic fluid in said cushion well as said plug enters said cushion well.

21. An apparatus for opening and closing mold halves in an I.S. glassware forming machine, comprising:
a cylinder;
a pair of hydraulic actuated pistons mutually facing and reciprocating within said cylinder;
a pair of linkage assemblies, each having two ends and each connected at one of the two ends to a respective one of said pistons;
a pair of shafts, each for actuating a mold half and each of said linkage assemblies connected at the other of its two ends to a respective one of said shafts to actuate said respective one of said shafts;
an hydraulic actuated plug and cushion well combination disposed between at least one of said pistons and said cylinder for cushioning the movement of said pistons, said cushion well defining a blind opening and said plug having a taper along its length to provide a decreasing bleed out rate of hydraulic fluid as said plug enters said cushion well.

22. The apparatus for opening and closing mold halves of claim 21 wherein said pistons have mutually facing sides and mutually opposing sides, wherein said cushion well is defined in the mutually opposing side of said at least one of said pistons, wherein said plug is connected to and extends from said cylinder, and wherein said plug and said cushion well are aligned coaxially with said pistons.

23. The apparatus for opening and closing mold halves of claim 22 wherein said plug is frustconically tapered and said apparatus further including equalizing means for causing said pistons to reciprocate equally and oppositely within said cylinder.

24. The apparatus for opening and closing mold halves of claim 23 wherein said equalizing means includes an idler gear and a pair of gear racks, each gear rack connected to one of said pistons, the gear racks meshing with said idler gear on opposite sides of said idler gear.

* * * * *

UNITED STATES PATENT AND TRADEMARK OFFICE
CERTIFICATE OF CORRECTION

PATENT NO. : 4,832,727

DATED : May 23, 1989

INVENTOR(S) : Harold C. Libert

It is certified that error appears in the above-identified patent and that said Letters Patent is hereby corrected as shown below:

In column 3, line 53, please change "chamber" to --chambers--.

In column 5, line 11, please change "rearard" to --rearward--.

In column 5, line 67, after "the", please insert --underside of the--.

In column 6, line 21, please change "147" to --137--.

Signed and Sealed this

Sixth Day of February, 1990

Attest:

JEFFREY M. SAMUELS

Attesting Officer     Acting Commissioner of Patents and Trademarks